United States Patent
Deacon

(10) Patent No.: US 6,393,761 B1
(45) Date of Patent: May 28, 2002

(54) FLOWER BUD WRAPPER

(75) Inventor: Dennis Deacon, 4869 Carpinteria Ave., Carpinteria, CA (US) 93013

(73) Assignee: Dennis Deacon, Carpinteria, CA (US)

( * ) Notice: Subject to any disclaimer, the term of this patent is extended or adjusted under 35 U.S.C. 154(b) by 0 days.

(21) Appl. No.: 09/379,886

(22) Filed: Aug. 23, 1999

(51) Int. Cl.$^7$ ............................................. A01G 5/00
(52) U.S. Cl. .................. 47/41.01; 47/58.1; 47/41.1; 47/65.8; 47/66.3
(58) Field of Search ............................ 47/41.01, 58.1, 47/41.1, 65.8, 66.3, 66.7, 78

(56) References Cited

U.S. PATENT DOCUMENTS

| | | | |
|---|---|---|---|
| 2,774,187 A | 12/1956 | Smithers | 47/41 |
| 3,271,922 A | 9/1966 | Wallerstein et al. | 53/3 |
| 3,376,666 A | 4/1968 | Leonard | 47/41 |
| 3,508,372 A | 4/1970 | Wallerstein et al. | 53/3 |
| 5,060,417 A | 10/1991 | Court | 47/41.15 |
| 5,293,713 A | 3/1994 | Ahmed | 47/55 |
| 5,381,642 A | 1/1995 | Weder et al. | 53/399 |
| 5,501,060 A | 3/1996 | Weder et al. | 53/399 |
| 5,687,502 A | 11/1997 | Weder | 47/41.01 |
| 5,765,305 A | 6/1998 | Shaw | 47/58 |
| 6,058,651 A | * 5/2000 | Perez | 47/65.8 |

* cited by examiner

*Primary Examiner*—Peter M. Poon
*Assistant Examiner*—Floris C Copier
(74) *Attorney, Agent, or Firm*—Marvin E. Jacobs

(57) ABSTRACT

A flower bud wrapper includes a semi-rigid, perforated, expandable tube, preferably containing a longitudinal slit. The wrapper can be expanded by pushing the tube down a flared delivery tube having a key disposed in the slits by a set of expandable prongs pushing on a lip connected to the top end of each wrapper.

9 Claims, 4 Drawing Sheets

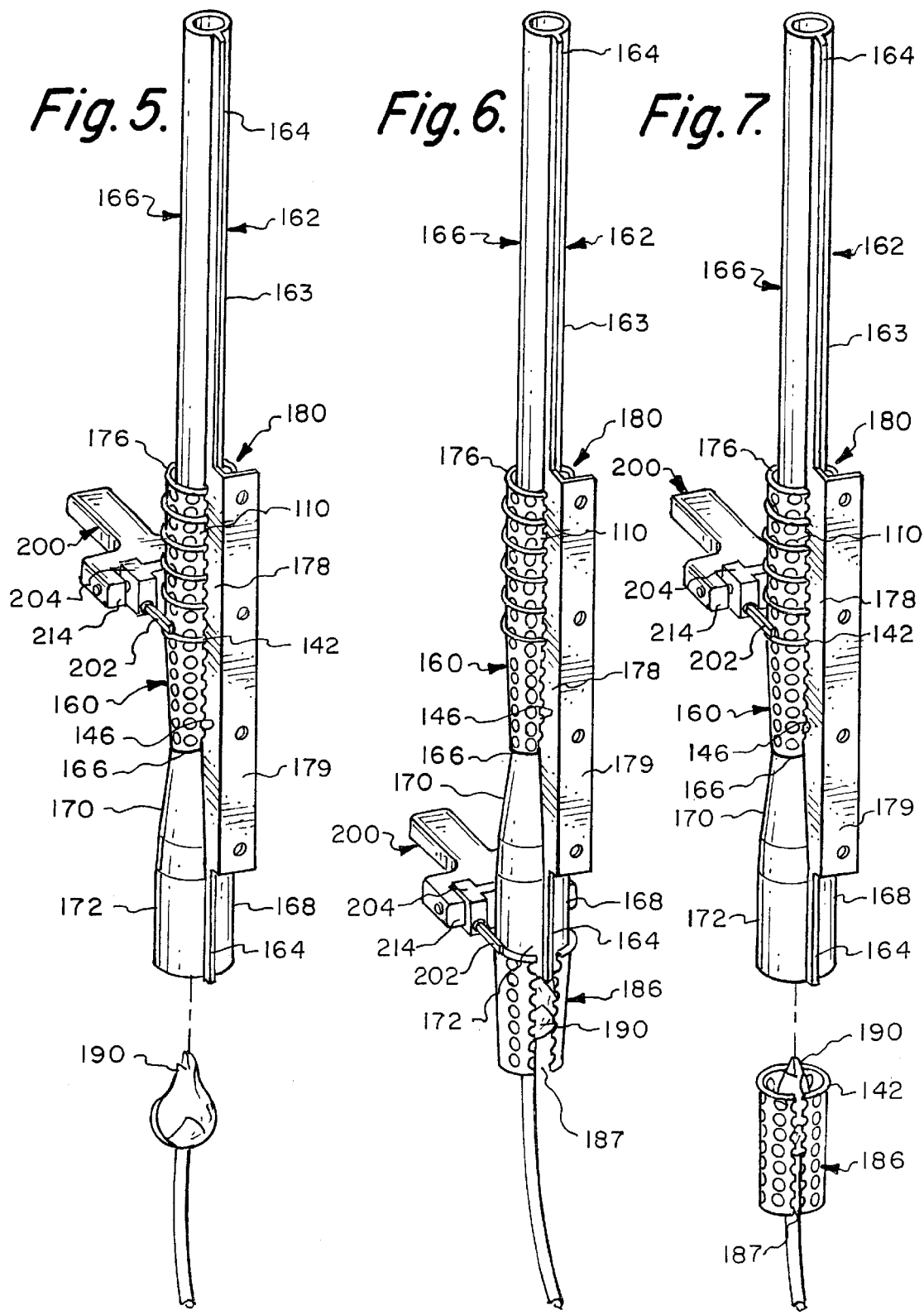

FLOWER BUD WRAPPER

TECHNICAL FIELD

The present invention relates to floriculture and, more particularly, this invention relates to a device for restraining a flower bud from opening until after the flower bud is cut from the plant.

BACKGROUND OF THE INVENTION

Flower sales in the United States and throughout the world is a multibillion dollar industry. A large segment of the sales are of cut flowers which are sold individually or in bunches for display and enjoyment in homes, offices, churches, funerals, restaurants and at catering establishments for events such as weddings, anniversaries, etc.

Flowers are grown in large farms or hot houses. When ready for the market, the head of the plant and a portion of the stem is cut. The flowers are bundled and sold to wholesalers and retailers such as flower shops. Flowers with larger heads bring a higher price at wholesale and retail. Though the grower tries to consistently produce flowers with large heads, due to differences in feed, exposure and individual genetics, commercially grown flowers blossom randomly over relatively long periods of time. A grower can harvest a field at one time, hopefully when the plants are in the best commercial condition. The cut flowers must be sorted by size of bud before distribution. Occasionally, picking crews must pick the same crop several times as the buds mature in order to harvest all the flowers in the field or hot house.

Some plants will not be marketable. With roses, the ideal or best time to harvest the flower is when the rose bud has grown to the largest size possible without substantial opening of the petals. However, the tighter the petals, the longer the plant will last after cutting. If a rose stem is cut too soon, the size of the rose head will be small and the rose will bring a lower price. If the rose plant is very underdeveloped, the petals will be very tight and the rose will not open. If the plant is cut too long after the ideal time, the petals will already be open and the flower will have a shorter life.

STATEMENT OF THE PRIOR ART

The need to prevent premature opening of a flower bud such as a rose bud prior to harvest, has been recognized. One popular method of preventing some types of flowers from blooming prematurely is to install a soft, net-like, elastic sleeve over the group of preflowering buds and to remove the sleeves after cutting the flower, thereby causing the buds to attain larger size and flower closer together in time. The net expands as the bud grows but does prevent the bud from opening prior to cutting the stem from the plant. The open netting allows light to reach the outer petals of the bud but the constriction provided by the sleeve prevents light and heat from reaching the inner petals of the bud. Lower temperature reduces the respiration rate and absence of light slows growth. The result is a stronger, healthier larger bud. The netting can remain on the bud during distribution, which further prolongs shelf life and protects the petals from abrasion forces.

However, the only known method of installing the sleeve on a bud is by hand labor. The soft net collapses and is difficult to manipulate, to open and insert a bud. Since a commercial greenhouse can grow millions of buds simultaneously, the installation of the sleeves is time consuming and expensive. Savings in time, labor and costs would be substantial if the installation of the sleeves could be automated. However, the sleeves are soft and collapsible making it difficult to expand, place over a bud and release the expanded net by a mechanized feeder. Furthermore, the apertures allow the thin net to readily engage any protrusion on a feeding apparatus. Automation would be difficult. Automatic feeding the sleeves to and removing them from a plant would not be reliable.

LIST OF PRIOR ART 2,774,187 Smithers—Package for cut flowers with water containing foam receiving cut end of flower 3,271,922 Wallerstein—A circular, paper band for wrapping flowers during shipment 3,376,666 Leonard—A truncated conical sleeve of soft, resilient plastic 3,508,372 Wallerstein—Flexible paper sheet wrap for cut flowers 5,060,417 Court—Split, tubular device for supporting the head of cut flowers 5,293,713 Ahmed—Split, tubular device to prevent stem from drooping 5,381,642 Weder et al.—Conical plastic film wrapping of floral arrangement 5,501,060 Weder et al.—Conical plastic film wrapping of floral arrangement 5,687,502 Weder—Protective plastic film wrapper adhesively connected to vase 5,765,305 Shaw—Cover bud with elastic netting to increase size of rosehead

DISCUSSION OF PRIOR ART

The only patent disclosing wrapping a bud on an uncut flower before blooming is Shaw. The remaining patents all relate to wrapping cut flowers. Court and Ahmed disclose a split tubular wrapper for supporting the head of cut flowers. There are no apertures for bud growth and it used on cut, not pre-cut flowers growing on a stem.

STATEMENT OF THE INVENTION

The present invention provides a bud wrapper readily adaptable to automation and to an apparatus for installing the wrapper on a pre-cut bud. The installation apparatus automatically places the bud wrapper on the bud without the need to handle the wrapper. The next wrapper automatically feeds into the installation position. The apparatus expands the wrapper in amount sufficient to clear the outside of the pre-flowering head while positioned above it. The expanded wrapper is lowered around the head and is released onto the head. The wrapper contracts around the head applying pressure around the circumference of the head inhibiting the head from blossoming while the wrapper is present. The next wrapper feeds into the installation position during installation of the prior wrapper.

The wrapper remains on the bud through growth, harvest, shipment and delivery to the retailers. It need not be removed until delivery to the ultimate consumer.

BRIEF DESCRIPTION OF THE DRAWINGS

FIG. 5 is a front view in elevation of an automated bud wrapper installation tool and wrapper bud feeding tube assembly shown positioned above a flower bud;

FIG. 6 is a front view in elevation of the tool and feeding tube assembly of FIG. 5 shown with the bud wrapper expanded over a flower bud;

FIG. 7 is a front view in elevation of the bud wrapper installed on a flower bud;

DETAILED DESCRIPTION

Figure 1:
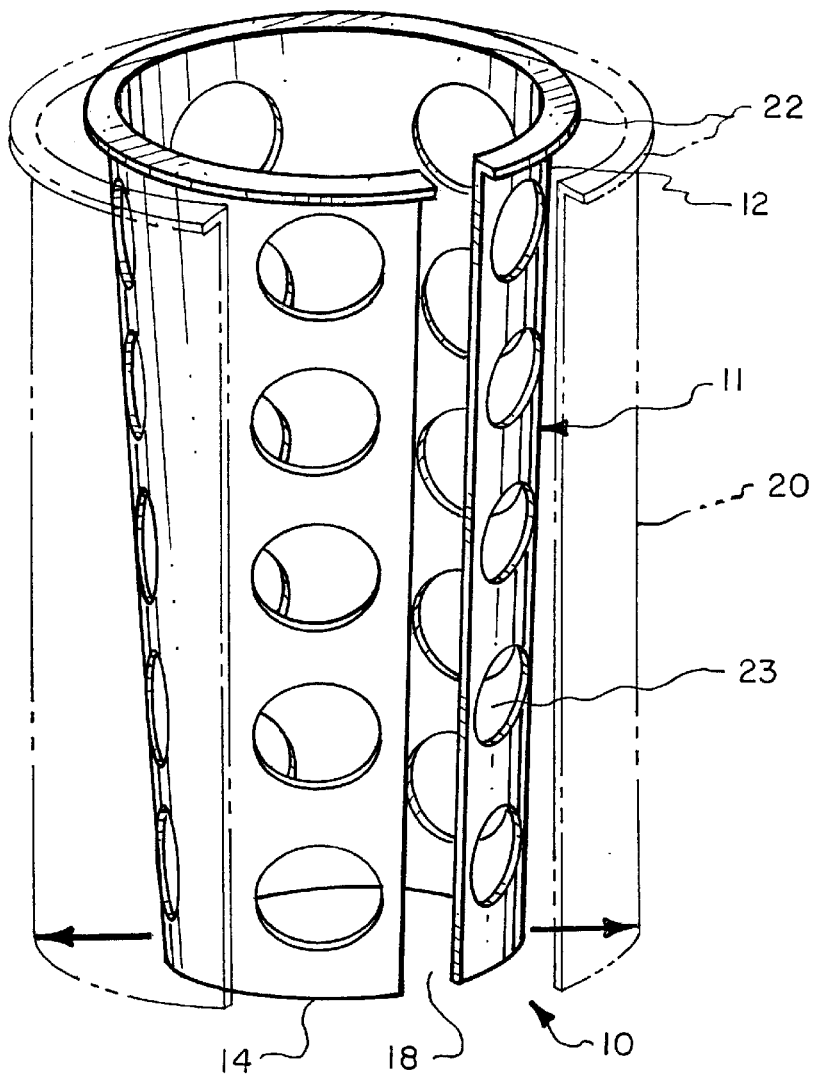
FIG. 1 is a perspective view of a flower bud wrapper of the invention with the expanded wrapper also shown in dotted lines.
Figure 2:
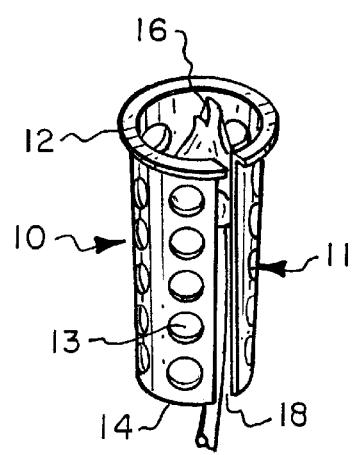
FIG. 2 is a perspective view of the bud wrapper installed on a flower bud.

Referring now to FIGS. 1 and 2 a first embodiment of a flower bud wrapper 10 according to the invention comprises a semi-rigid tube 11 with a circular cross section having an open upper end 12 and an open lower end 14. Semi-rigid with memory is used in the present text to define a hollow tubular member that is self-standing, will maintain its shape, will expand when placed under force but will return to its initial form when the expansion force is removed. The tube 11 is sized to encase a bud 16. The tube 11 has a slit 18 extending between the ends 12, 14 so that the tube 11 is expandable to the spread position 20 shown in dotted lines so that it can be lowered over a flower bud 16 before it has flowered. The tube 11 can have a taper from end 12 to end 14 to allow compressed stacking of multiple wrappers 160. The top end 12 of the tube 11 can contain a lip 22 to provide a gripping surface on the tube 11 and to aid in individually feeding a wrapper 10 from a stacked set of wrappers. The tube 11 contains a series of apertures 22 to permit light to reach the bud 16 and to permit inspiration of carbon dioxide and expiration of oxygen from the bud.

The tube 11 is formed of a semi-rigid, flexible and resilient material with memory such as metal or a synthetic organic resin. Organic resins which are not effected by exposure to water and sunlight are preferred, suitably thermoplastic hydrocarbon polymers. Polyalkylene resins, such as polyethylene or polypropylene resins are preferred. Wrappers can readily be manufactured by molding or extrusion. The wall thickness of the tubes is maintained as small as possible consistent with the requirement to provide a rigid, resilient product. The size and number of perforations are selected to maximize exposure to light consistent with retaining rigidity. Also if the wall material including perforations becomes too thin, the binding material could cut into the outer petals.

In order to automate the installation process, the bud wrappers can be stacked. However, even with self-lubricating plastics such as polyethylene or nylon, the weight of gravity could cause the wrappers to jam together. Also, the wrappers could stack so closely together that there is no room to engage the top gripping surface or flange to dispense a wrapper.

Figure 3:
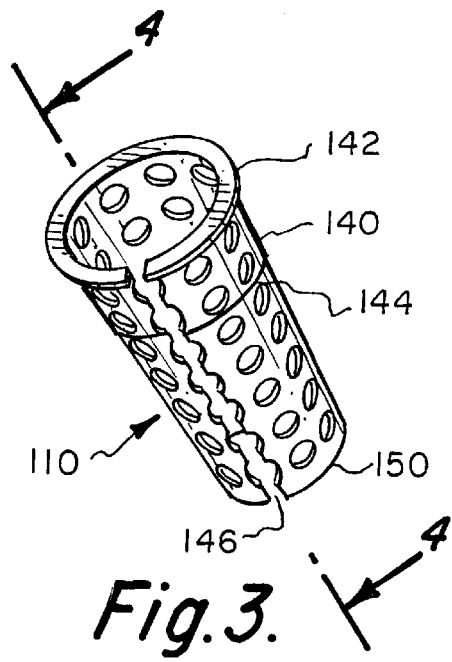
FIG. 3 is a perspective view of another embodiment of a flower bud wrapper.
Figure 4:
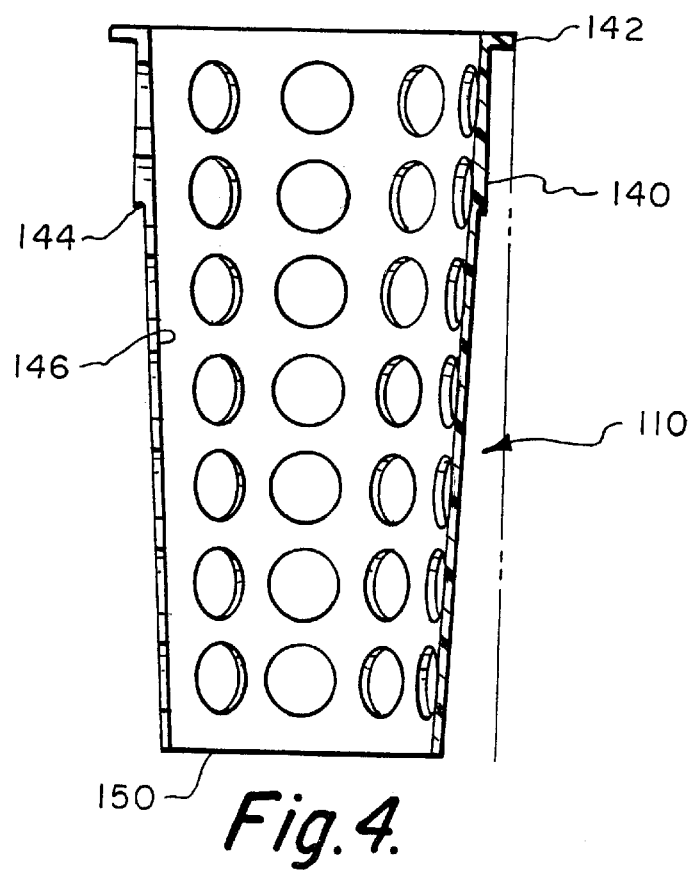
FIG. 4 is a view in action taken along line 4—4 of FIG. 3.

Referring now to FIGS. 3 and 4, a further embodiment of a bud wrapper 110 is illustrated. The wrapper 110 is manufactured with a shoulder or stacking surface 140. The slit 146 extends continuously from the flange 142 to the lower edge 150 of the wrapper 110. The taper of the wrapper 110 also facilitates stacking of the wrappers 160.

As illustrated in FIGS. 5–7, a stack 160 of wrappers 110 is loaded into a delivery assembly 180 by inserting the stack onto the cylindrical top portion 163 of the loading tube 162 with the key guide 164 penetrating the slits 146. The stack 160 rests on the top end 166 of the hollow flared bell 168. The bell 168 has an upper conical section 170 and a lower cylindrical section 172. In order to hold the tube 162 in position to deliver a wrapper, a portion of the key guide 164 can extend outwardly from the tube 162 forming a flange 178 which can be connected to a handle 179 or other mechanism.

A flower bud wrapper 110 is dispensed from the delivery assembly 180 by gripping the lip 142 of the lowermost wrapper in the stack 160, pushing it downwardly over the flared bell 168 onto the cylindrical portion 172. The expanded wrapper 186 is pushed downwardly until the lower end 187 of the wrapper 180 is over a flower bud 190. The expanded wrapper 186 is pushed off the delivery assembly 180 and contracts around the flower bud 190 as shown in FIGS. 5–7. An important feature of the invention is the combination of a keyed, flared delivery tube with the slit, flower bud wrapper. The delivery assembly can be readily used with a mechanical accelerator to slide the wrappers down the delivery tube.

Figure 8:
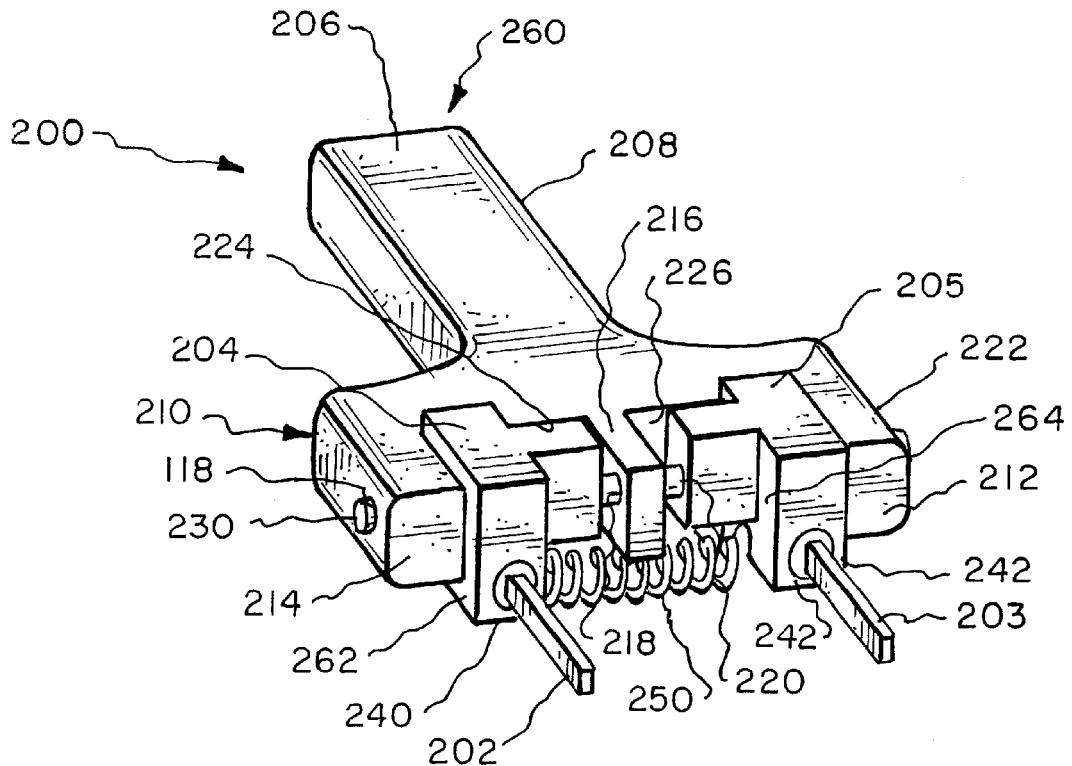
FIG. 8 is a perspective view of the installation tool with the fingers in spread position.
Figure 9:
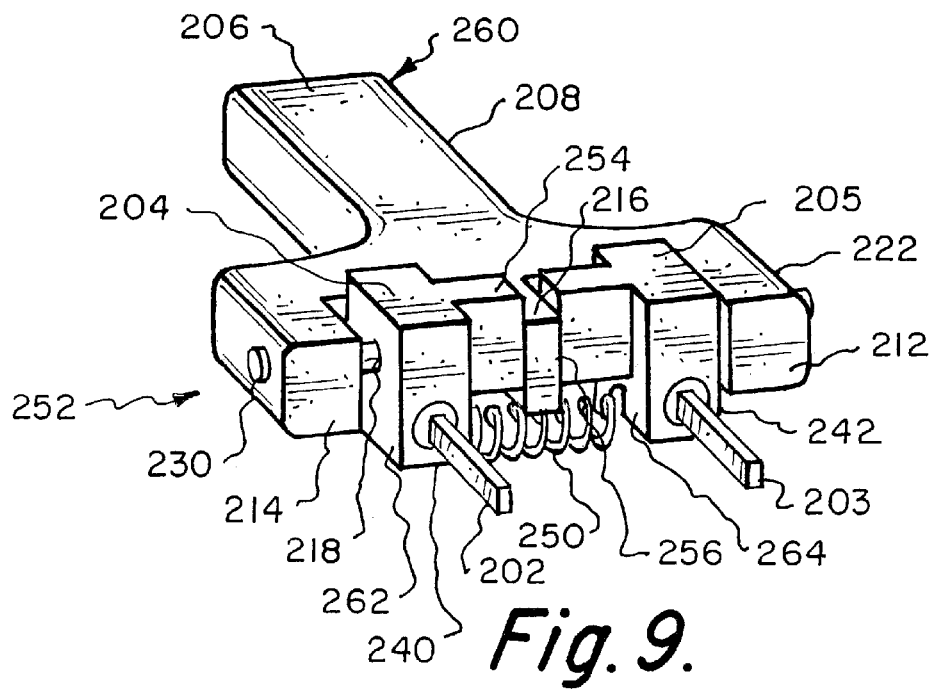
FIG. 9 is a perspective view of the installation tool with the fingers shown in normal position.

Referring now to FIGS. 8 and 9, a mechanical wrapper dispensing device 200 is illustrated. The device 200 contains a pair of rigid spaced prongs 202 203 for engaging the top of the lips 142 of the uppermost wrapper 110 in the stack 160. The prongs are mounted in slide blocks 204 205. The blocks 204, 205 each have a horizontal cylindrical bore, not shown. The device 200 has a body 208 having a rear handle 206 connected to an enlarged forward section 210. The section 210 has two outer fingers 212 214 and a central stop finger 216. The fingers 212, 214 and 216 each have a cylindrical bore 218, 220, 222 which align with the cylindrical bores in the slide blocks 204, 205. The blocks 204, 205 are mounted in the device 200 by placing a common cylindrical pin 230 through the bores 218, 220, 222 with all the cylindrical bores 218, 220, 222 in alignment, allowing the blocks 204, 205 to slide horizontally.

The cavities 224, 226 each have a width slightly larger than that of the blocks 204, 205. The blocks are thicker than the forward section of the body 210. A portion 240, 242 of each block extends below the body. The protruding portions 240, 242 are connected by a spring 250 so that the normal position of the sliding blocks is the closed position 252 with the inner surfaces 254, 256 of the blocks 204, 205 engaging the central stop finger 216. The expanded position 260 of the blocks 204, 205 is shown in FIG. 8 with the outer surfaces 262, 264 of the blocks 204, 205 engaging the inner walls of the fingers 212, 214.

Referring again to FIGS. 5–7, the device 200 is shown in FIGS. 3 and 6 in the expanded position with the prongs 202, 203 engaging the top of a lip 142. The prongs 202, 203 push the wrapper 110 off the flared bell 170. The fingers 202, 203 contract to the normal position shown in FIG. 9. The fingers are expanded again as they move downward from the top of the delivery tube 166 above the lip 142 of the next wrapper.

The vertical movements of the device 200 can be activated pneumatically, electrically, manually or by a combination of any or all of these automated movement mechanisms.

It is to be realized that only preferred embodiments of the invention have been described and that numerous substitutions, modifications and alterations are permissible without departing from the spirit and scope of the invention as defined in the following claims.

What is claimed is:

1. A flower bud wrapper comprising:
a self-standing, resilient and expandable hollow tube having an upper open end and a lower open end joined by an at least semi-rigid wall forming a chamber between said ends, said chamber being sized to receive and substantially completely engage the outer petals of a flower bud before flowering and to prevent the flower bud from opening, said tube contains a continuous, longitudinal slit between said ends and a plurality of perforations sufficient to maximize exposure of the bud to light while retaining rigidity of the tube and the tube expandable along said slit from a first position sufficient to engage said bud to a second position wider than said bud and having memory to return to said first position.

2. A flower bud wrapper according to claim 1 in which the tube has a cylindrical, cross-section, has a longitudinal axis and said slit is parallel to said axis between said ends.

3. A flower bud wrapper according to claim 1 in which the tube tapers from the first end to the second end.

4. A flower bud wrapper according to claim 1 in which the first end contains a circumferential, outer lip.

5. A flower bud wrapper according to claim 3 in which the tube contains an outer stacking sleeve adjacent to first end of the tube.

6. A flower bud wrapper according to claim 1 in which the tube is semi-rigid formed and of a flexible, synthetic resin.

7. A flower bud wrapper according to claim 4 in which the resin is a hydrocarbon resin.

8. A flower bud wrapper according to claim 5 in which the resin is selected from polyethylene or polypropylene.

9. A method of delaying a preflowering bud from opening comprising the steps of:
expanding a perforated, hollow tube having perforations in a wall of the tube, said wall being at least semi-rigid and said tube having a continuous, longitudinal slit between ends of the tube along said slit to a size larger than the bud;

placing the expanded tube substantially completely over the bud;

contracting the expanded tube until the inner wall of the tube contacts outer petals of the bud and completely encases said bud and prevents said bud from opening.

* * * * *